United States Patent [19]

Cekander et al.

[11] Patent Number: 5,082,322
[45] Date of Patent: Jan. 21, 1992

[54] VISOR ROD MOUNT

[75] Inventors: John W. Cekander, Wyoming; Doug J. Redder, Zeeland; Chris R. Waldron, Wyoming, all of Mich.

[73] Assignee: Prince Corporation, Holland, Mich.

[21] Appl. No.: 662,237

[22] Filed: Feb. 28, 1991

[51] Int. Cl.$^5$ .............................................. B60J 3/02
[52] U.S. Cl. ................................ 296/97.9; 296/97.121
[58] Field of Search ............... 296/97.9, 97.12, 97.13; 248/289.1

[56] References Cited

U.S. PATENT DOCUMENTS

| | | | |
|---|---|---|---|
| 2,110,120 | 6/1934 | Ball | 296/97 |
| 2,357,974 | 7/1939 | Roberts | 248/289 |
| 4,352,518 | 10/1982 | Prince et al. | 296/97 |
| 4,377,020 | 3/1983 | Vigo | 16/329 |
| 4,553,797 | 11/1985 | Marcus | 339/22 |
| 4,569,552 | 2/1986 | Marks | 296/97.13 |
| 4,634,196 | 1/1987 | Nestell | 339/5 |
| 4,729,590 | 3/1988 | Adams | 296/97.13 |
| 4,893,866 | 1/1990 | Dowd et al. | 296/214 |
| 4,989,911 | 2/1991 | Van Order | 296/97 |

FOREIGN PATENT DOCUMENTS 2341940 11/1977 Fed. Rep. of Germany .

Primary Examiner—Johnny D. Cherry
Assistant Examiner—Joseph D. Pape
Attorney, Agent, or Firm—Price, Heneveld, Cooper, DeWitt & Litton

[57] ABSTRACT

A snap-in visor rod mount inserted within the supporting structure of a vehicle roof includes a molded-on torque fitting which integrally includes a spring clip for lockably mounting the visor rod end to the vehicle. In a preferred embodiment of the invention, the vehicle includes a conically shaped socket having a keyway formed therein terminating in a horizontally extending flange and the spring clip includes an end with and inclined edge which lockably engages the flange of the socket while the torque fitting includes a key which aligns with and prevents rotation of the torque fitting within the socket allowing the visor rod to rotate with respect to the torque fitting. Also in a preferred embodiment a bezel is provided which includes an upwardly extending leg extending behind the spring leg to lock the spring leg into position once installed.

22 Claims, 1 Drawing Sheet

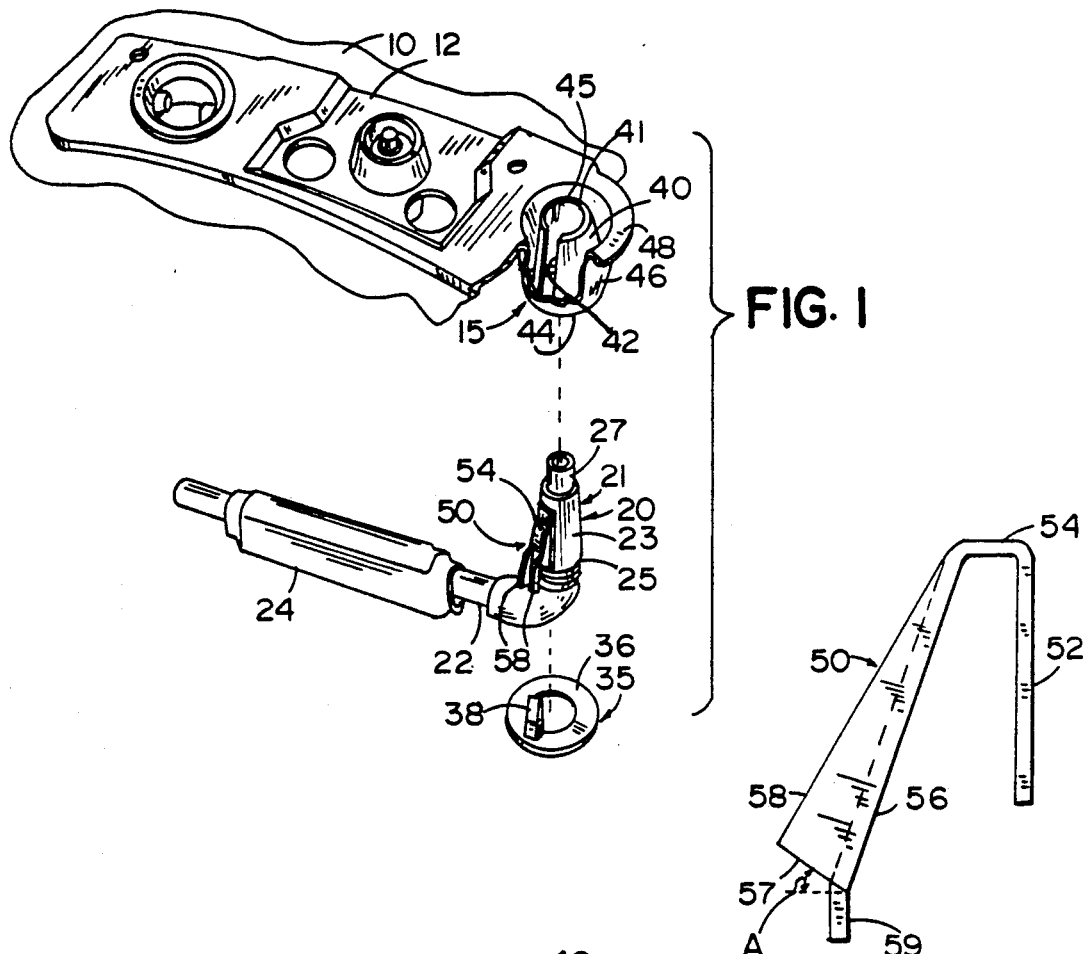
FIG. 1
FIG. 3
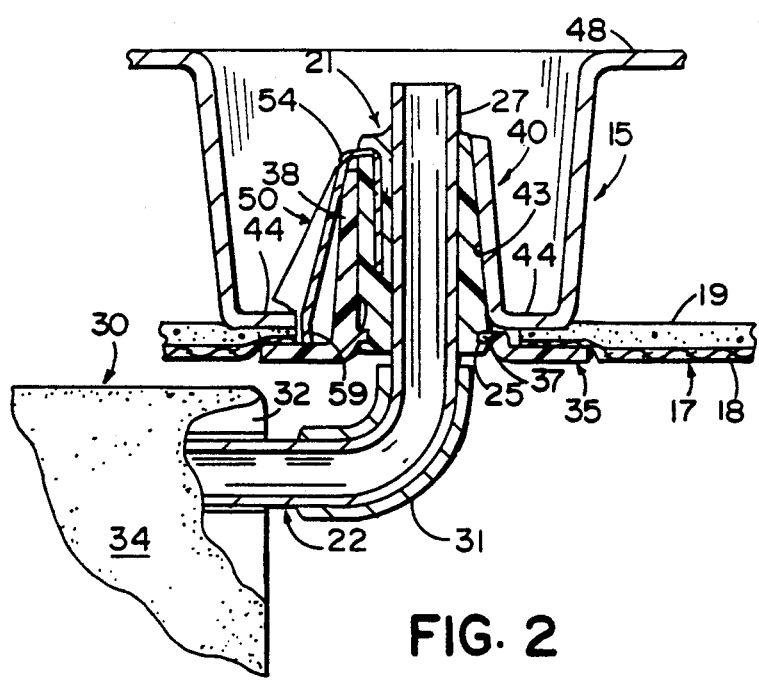
FIG. 2

VISOR ROD MOUNT

BACKGROUND OF THE INVENTION

The present invention pertains to a mounting assembly and particularly one used for attaching the end of a visor pivot rod to the roof of a vehicle.

There exist a variety of structure in which vehicle visors are attached to the roof structure of a vehicle. U.S. Pat. Nos. 4,569,552 and 4,989,911 disclose spring clip assemblies used in connection with a visor rod mounting bracket with the combination then snap-fitting within the vehicle sheet metal roof structure. A variety of molded-on torque fittings which are held in place with a spring arm mounted to the vehicle headliner or a special mounting bracket also have been employed. U.S. Pat. Nos. 4,553,797 and 4,634,196 are representative of such construction. Other attachment systems have employed mounting screws which extend through a conventional mounting bracket and then directly into a sheet metal roof header of the vehicle. Other totally polymeric snap-in systems have also been proposed, however the polymeric material tends to creep under the weight and movement of the visor and eventually with the use of the visor, they tend to loosen. Thus although snap-in construction is preferable since it provides easy manufacturing during assembly line construction of a vehicle, it has been somewhat difficult to obtain relatively inexpensive structure which provides secure fastening to the vehicle roof with a minimum of complicated parts.

SUMMARY OF THE PRESENT INVENTION

The visor mounting system of the present invention, provides the ease of assembly of a snap-in visor assembly which additionally provides secure stable operation of a visor over a long period of time through the use of a metallic spring clip which is integrally molded within a polymeric torque fitting molded to the end of a visor rod to provide snap-lock insertion and installation of a visor rod and into a socket formed in the vehicle sheet metal roof structure.

Apparatus embodying this invention includes a visor pivot rod having a molded-on torque fitting at one end for insertion into the vehicle roof to allow the visor rod to pivot within the torque fitting which is keyed against rotation with respect to the vehicle roof. A spring clip extends laterally outwardly from the molded-on torque fitting and is integrally secured to the torque fitting. The clip includes an end configured to grip an edge of the vehicle sheet metal roof structure for locking the assembly in place once inserted into a socket formed in the roof structure. This construction provides a relatively inexpensive and efficient construction for a visor rod mount which improves ease of assembly and reduces the cost of the construction dramatically over multiple component snap-in visor assemblies.

These and other features, objects and advantages of the present invention, will become apparent upon reading the following description thereof together with reference to the accompanying drawings in which:

BRIEF DESCRIPTION OF THE DRAWINGS

FIG. 1 is an exploded fragmentary and partly broken-away view of a vehicle roof and visor mounting assembly embodying the present invention;

FIG. 2 is an enlarged fragmentary vertical cross-sectional view of the structure shown in FIG. 1 with a visor mounted thereto and shown assembled to the vehicle; and FIG. 3 is a greatly enlarged side elevational view of the spring clip shown in FIGS. 1 and 2.

DETAILED DESCRIPTION OF THE PREFERRED EMBODIMENT

Referring initially to FIG. 1, there is shown a vehicle roof 10 including a diecast header 12 which is mounted to the vehicle roof near the front windshield of the roof. Member 12 includes a plurality of mounting apertures for a variety of vehicle accessories. Of significance with respect to the mounting structure of the present invention however, is a mounting socket 15 shaped to receive the visor mounting assembly 20 of the present invention. Assembly 20 is mounted at end 27 of a visor pivot rod 22 for snap-fitting a visor 30 (FIG. 2) to the vehicle roof by the interconnection of members 20 and 15. As seen in FIGS. 1 and 2, a trim bezel 35 extends over and lockably mates with member 20 for providing a trim finish to the structure once assembled as shown in FIG. 2. Covering the roof 10 of the vehicle, including header 12 is a decorative upholstery fabric 17 which includes a fabric outer surface 18 and an integral foam back lining 19 which is of conventional construction and which is compressibly held under the washer-shaped trim bezel 35. The visor pivot rod 22 extends and is locked into the core 32 of the visor 30 and is secured therein in part by a torque fitting 24 which can be of the type disclosed in U.S. Pat. No. 4,500,131 for allowing the visor 30 to pivot along the longitudinal (i.e. horizontal) axis of the L-shaped pivot rod 22. Assembly 20 allows the visor to pivot along the vertical axis V shown in FIG. 1 for movement of the visor from a front windshield position to a side window position as desired. Having briefly described the overall system components, a detailed description of the components and their interrelationship is now presented.

The header socket 15 defines an inverted truncated conical center aperture 45 formed by wall 40 having a vertically extending slot 42 extending downwardly from the upper rim 41 of the socket and terminating in a ledge 44 which, as best seen in FIG. 2, receives visor mounting assembly 20. The conical sidewall 40 integrally extends outwardly through the ledge or flange 44 and then upwardly in an outer conical wall 46 spaced from inner wall 40. Wall 46 terminates at its upper end in the upper platform 48 of the header 12. Wall 40 defines the tapered or conical opening 45 into which the visor rod mounting assembly 20 mateably extends as seen in FIG. 2.

Assembly 20 includes a polymeric molded-on torque fitting 21 having a generally truncated conical outer sidewall 23 conforming to the taper of the inner surface of 43 of wall 40 as best seen in FIG. 2. Integrally formed in fitting on the outer surface of wall 23 is an enlarged elongated ridge defining a key member 29 which extends vertically and has a width corresponding to that of slot 42 for locking the torque fitting within socket 15 as best seen in FIG. 2. Thus the vertically extending key member 29 prevents rotation of the torque fitting 21 within socket 15 while allowing rotation of rod end 27 with respect to torque fitting 21 in a controlled manner. Near the lower end of the tapered polymeric fitting 21 there is provided an annular recess 25 for snap-receiving the washer-shaped bezel 35. The polymeric torque fitting 21 is made of a suitable polymeric material integrally molded to the upper end 27 of visor pivot rod 22. Such polymeric material preferably is an acetal and particularly an acetal homopolymer such as Delrin 500 DK 602 which provides the desired characteristics for this application. Other polymeric materials having a shrinkage of from about 0.020 to 0.025 inches per linear inch to compressibly engage the cylindrical end 27 of hollow pivot rod 22 also can be used. This material is characterized in that when cooled, it will not set up against the visor pivot rod thereby providing a desired breakaway torque of from about one half to six foot pounds, depending upon the visor in which the invention is employed. Another suitable material which can be used is Celcon UV-90.

Integrally molded within the torque fitting 21 is a spring-locking clip 50 which includes a generally rectangular anchor leg 52 extending vertically within the integral torque fitting 21 as best seen in FIG. 2. Clip 50 is best seen in FIG. 3 and includes an integral horizontally extending segment 54 which extends partially within torque fitting 21 slightly below the upper rim of the torque fitting. Integrally formed at the end of segment 54 remote from leg 52 is a downwardly and outwardly inclined leg 56 which includes a pair of triangular laterally extending flanges 58 on opposite edges thereof as best seen in FIGS. 1 and 3. As seen in FIG. 3 the bottom of leg 56 terminates in a vertically extending tab 59 which as seen in FIG. 2 can be accessed by the gap between the upper surface of bezel 35 and the lower surface of flange 44 of socket 15 by a suitable tool such as a screwdriver if necessary to compress the spring leg 56 inwardly toward the pivot rod 22 for removal of the visor assembly if necessary after installation. The spaced triangular flanges of spring clip 50 each terminate in a locking edge 57 which is inclined at an angle "a" of approximately 35 degrees to grip the corner 47 (FIG. 2) of flange 44 for locking the visor rod end into socket 15.

The spring clip 50 is made of a suitable spring steel stamping and is held in place within the enlarged key 29 integrally formed in the torque fitting 21 with leg 52 held in vertical spaced alignment with respect to the end 27 of rod 22 during the molding of the fitting 21. The end 27 of visor rod 22 may include an annular recess (not shown) under the fitting 21 if desired into which the molded-on torque fitting 21 extends for preventing rod end 27 from longitudinal motion with respect to the torque fitting. The elbow section of the visor rod 22 includes a decorative plastic sleeve 31 made of polycarbonate or other suitable material.

Bezel 35 includes an outer washer-shaped flange 36 and upwardly inclined somewhat thinner inner section 37 as best seen in FIG. 2. The polymeric bezel includes a generally vertically extending tapered locking rib 38 which extends, as best seen in FIG. 2, under and behind leg 56 of spring clip 50 to assist in wedging and holding the spring clip leg in its outward locking position as illustrated in FIG. 2. Bezel ring 35 is fitted over the end of the visor rod before torque fitting 24 is installed prior to assembly and rests in the space between decorative cover 31 and torque fitting 21 until the visor is snap-fitted into position by the insertion of the torque fitting 21 in the conical socket 15 until the edges 57 of triangular flanges 58 are locked and wedged against the corner 41 of ledge 44. This snap-fits and locks the keyed torque fitting 21 of the mounting assembly 20 for visor 30 into the socket 15 of the vehicle roof assembly for mounting the visor to the vehicle roof 10. Bezel 35 is then pressed upwardly until ring 37 snap-fits within annular recess 25 with leg 38 positioned behind and in contacting engagement with the inner surface of leg 56 of spring clip 50.

With this construction, the torque fitting integrally includes a spring clip and interlocking key means for preventing rotation of the mounting assembly with respect to the vehicle roof to which it is mounted. The utilization of a conical socket 15 and similarly tapered torque fitting 21 assures that the visor will not loosen during use by providing a significant mating surface between the two elements which is tapered for a snug fit and positively locked and keyed into position. The visor 30 to which the hollow visor rod 22 is attached is covered with a suitable upholstery material 34 extending over the core 32 and may include an illuminated vanity mirror package or other internal electrical accessories which can be powered by conductors which extend through the hollow pivot rod 22 as necessary.

It will become apparent to those skilled in the art the various modifications to the preferred embodiment of the invention as described herein and can be made without departing from the spirit or scope of the invention as defined by the appended claims.

The embodiments of the invention in which an exclusive property or privilege is claimed are defined as follows.

1. A visor assembly for a vehicle having a windshield and a side window, said visor assembly comprising:
    a visor having a visor body and a pivot rod mounted therein and having an end extending from said body for attachment of said visor to a vehicle such that said visor can be moved between a raised stored position and a lowered use position and moved adjacent the windshield and a side window; and
    a visor mounting assembly including a torque fitting comprising a molded polymeric member integrally molded to said extending end of said visor rod and further including a spring clip extending outwardly and downwardly from a side of said torque fitting from an upper portion of said torque fitting, said spring clip including locking means for lockably engaging a vehicle support member for mounting said visor to a vehicle wherein at least a portion of said torque fitting surrounds an end of said spring clip for securing said spring clip to said visor mounting assembly.

2. A visor assembly for a vehicle having a windshield and a side window, said visor assembly comprising:
    a visor having a visor body and a pivot rod mounted therein and having an end extending from said body for attachment of said visor to a vehicle such that said visor can be moved between a raised stored position and a lowered use position and moved adjacent the windshield and a side window; and
    a visor mounting assembly including a torque fitting comprising a molded polymeric member integrally molded to said extending end of said visor rod and further including a spring clip extending outwardly and downwardly from a side of said torque fitting from an upper portion of said torque fitting, said spring clip including locking means for lockably engaging a vehicle support member for mounting said visor to a vehicle, wherein said spring clip is integrally molded within said torque fitting.

3. The visor assembly as defined in claim 2 wherein said spring clip is made of a spring steel material.

4. The visor assembly as defined in claim 3 wherein said spring clip includes an inner leg embedded in said torque fitting and an outer leg extending outwardly and downwardly therefrom in spaced relationship to the exterior of said torque fitting and wherein said locking means is formed on said outer leg.

5. The visor assembly as defined in claim 4 wherein said inner leg is an elongated leg extending in generally parallel relationship to said pivot rod.

6. The visor assembly as defined in claim 5 and further including a bezel extending over said visor rod and means for securing said bezel to a lower end of said torque fitting.

7. The visor assembly as defined in claim 6 wherein said bezel includes an upwardly extending leg which extends behind said spring clip for maintaining said spring clip in an extended position once installed.

8. The visor assembly as defined in claim 7 wherein said bezel is generally washer-shaped and wherein said means for securing said bezel to said torque fitting includes an annular recess formed at a lower portion of said torque fitting for receiving a circular inner edge of said bezel.

9. The visor assembly as defined in claim 8 wherein said locking means of said spring clip comprises at least one flange extending outwardly from said outer leg, said flange including an edge inclined at an angle to said outer leg for engaging the vehicle support member.

10. The visor assembly as defined in claim 9 wherein said outer leg includes a flange at opposite edges of said outer leg with each of said flanges including an inclined edge.

11. The visor assembly as defined in claim 10 wherein said outer leg of said spring clip includes a downwardly extending tab which extends adjacent said bezel.

12. The visor assembly as defined in claim 11 in combination with a vehicle header for mounting to the roof of a vehicle and including a mounting socket formed in said vehicle header and including a conically tapered sidewall for receiving said torque fitting.

13. The visor assembly as defined in claim 12 wherein said torque fitting includes a key member extending longitudinally along the side of said fitting and wherein said socket includes a slot formed therein for receiving said key member of said torque fitting.

14. The visor assembly as defined in claim 13 wherein said sidewall of said socket is tapered to conform to the conically tapered torque fitting and terminates in a flange which is engaged by said inclined edge of said flange of said spring clip.

15. A visor mounting assembly comprising:
a vehicle mounting member for securing to the roof of a vehicle and including a mounting socket formed in said vehicle mounting member, said socket including a sidewall terminating in a mounting flange;
a visor having a pivot rod mounted therein with an end extending for attachment of said visor to a vehicle for movement of said visor; and
a polymeric torque fitting integrally molded to said end of said pivot rod and holding a spring clip extending outwardly and downwardly from a side of said torque fitting from an upper portion of said torque fitting, said spring clip having an end defined by a pair of spaced flanges each terminating at an edge inclined to said flange of said socket, said edge lockably engaging said flange of said socket for mounting said visor to said vehicle mounting member.

16. A visor mounting assembly comprising:
a vehicle mounting member for securing to the roof of a vehicle and including a mounting socket formed in said vehicle mounting member, said socket including a sidewall terminating in a mounting flange;
a visor having a pivot rod mounted therein with an end extending for attachment of said visor to a vehicle for movement of said visor; and
a polymeric torque fitting integrally molded to said end of said pivot rod and including a spring clip extending outwardly and downwardly from a side of said torque fitting from an upper portion of said torque fitting, said spring clip having an end lockably engaging said flange of said socket for mounting said visor to said vehicle mounting member wherein said spring clip is integrally molded within said torque fitting.

17. The visor assembly as defined in claim 16 wherein said spring clip is made of a spring steel material.

18. The visor assembly as defined in claim 17 wherein said spring clip includes an inner leg embedded in said torque fitting and an outer leg extending outwardly and downwardly therefrom in spaced relationship to the exterior of said torque fitting and wherein said locking means is formed on said outer leg.

19. The visor assembly as defined in claim 18 wherein said inner leg is an elongated leg extending in generally parallel relationship to said pivot rod.

20. The visor assembly as defined in claim 19 and further including a bezel including an upwardly extending leg which extends behind said spring clip for maintaining said spring clip in an extended position once installed.

21. The visor assembly as defined in claim 20 wherein said bezel is generally washer-shaped and wherein said torque fitting includes an annular recess formed at a lower portion of said torque fitting for receiving a circular inner edge of said bezel.

22. A visor assembly comprising:
a visor having a visor body with a pivot rod mounted therein and having an end extending from said body for attachment of said visor to a vehicle;
a torque fitting comprising a polymeric member integrally molded to said extending end of said visor rod; and
a spring clip with an inner leg embedded within said torque fitting and including an outer leg extending outwardly and downwardly from a side of said torque fitting with an end for engaging a vehicle support member for mounting said visor to a vehicle.

* * * * *